United States Patent
Ding et al.

(10) Patent No.: US 11,850,866 B2
(45) Date of Patent: Dec. 26, 2023

(54) COMMUNICATION METHOD FOR CONSUMABLES CHIP, CONSUMABLES CHIP, AND CONSUMABLE

(71) Applicant: Hangzhou Chipjet Technology Co., LTD., Hangzhou (CN)

(72) Inventors: Lei Ding, Hangzhou (CN); Quan Sang, Hangzhou (CN)

(73) Assignee: Hangzhou Chipjet Technology Co., LTD., Hangzhou (CN)

( * ) Notice: Subject to any disclaimer, the term of this patent is extended or adjusted under 35 U.S.C. 154(b) by 52 days.

(21) Appl. No.: 17/441,277

(22) PCT Filed: Jun. 17, 2020

(86) PCT No.: PCT/CN2020/096519
§ 371 (c)(1),
(2) Date: Sep. 20, 2021

(87) PCT Pub. No.: WO2021/008291
PCT Pub. Date: Jan. 21, 2021

(65) Prior Publication Data
US 2022/0161567 A1   May 26, 2022

(30) Foreign Application Priority Data
Jul. 15, 2019   (CN) .......................... 201910635752.8

(51) Int. Cl.
*B41J 2/175* (2006.01)
*G06F 21/44* (2013.01)

(52) U.S. Cl.
CPC ........ *B41J 2/17546* (2013.01); *G06F 21/445* (2013.01); *G06F 2221/2129* (2013.01)

(58) Field of Classification Search
CPC ................ B41J 2/17546; G06F 21/445; G06F 2221/2129; G06F 21/44
(Continued)

(56) References Cited

U.S. PATENT DOCUMENTS 9,594,897 B2    3/2017  Lee
2012/0002224 A1  1/2012  Kimoto
(Continued)

FOREIGN PATENT DOCUMENTS

CN    101916062 A  † 12/2010
CN    103640339 A    3/2014
(Continued)

OTHER PUBLICATIONS

International Search Report for PCT/CN2020/096519 dated Sep. 9, 2020.

*Primary Examiner* — Matthew Luu
*Assistant Examiner* — Alexander D Shenderov
(74) *Attorney, Agent, or Firm* — Morse, Barnes-Brown & Pendleton, P.C.; Sean D. Detweiler, Esq.

(57) ABSTRACT

The present disclosure relates to the technical field of printer consumables, and in particular, to a communication method for a consumable chip, a consumable chip, and a consumable. The communication method for a consumable chip includes: in the process of consumable serial number authentication, performing non-AC authentication with an imaging device based on a first serial number, and performing AC authentication with the imaging device based on a second serial number. The non-AC authentication is performed on the chip by using the first serial number before the device is upgraded, such that the imaging device records the first serial number as a used chip serial number. The second serial number, which is set after the device is upgraded, is only used for AC authentication.

12 Claims, 1 Drawing Sheet

(58) Field of Classification Search
USPC .......................................................... 347/19
See application file for complete search history.

(56) References Cited

U.S. PATENT DOCUMENTS

2017/0123344 A1*   5/2017  He ....................... H04N 1/4433
2021/0390169 A1†  12/2021  Sun

FOREIGN PATENT DOCUMENTS

| CN | 104943397 A |   |  9/2015 |
|----|-------------|---|---------|
| CN | 105058997 A |   | 11/2015 |
| CN | 105058997 A | † | 11/2015 |
| CN | 105398224 A |   |  3/2016 |
| CN | 105492211 A |   |  4/2016 |
| CN | 106295376 A |   |  1/2017 |
| CN | 106626792 A |   |  5/2017 |
| CN | 108116053 A |   |  6/2018 |
| CN | 108804953 A |   | 11/2018 |
| CN | 109334259 A |   |  2/2019 |
| CN | 110378096 A |   | 10/2019 |

\* cited by examiner
† cited by third party

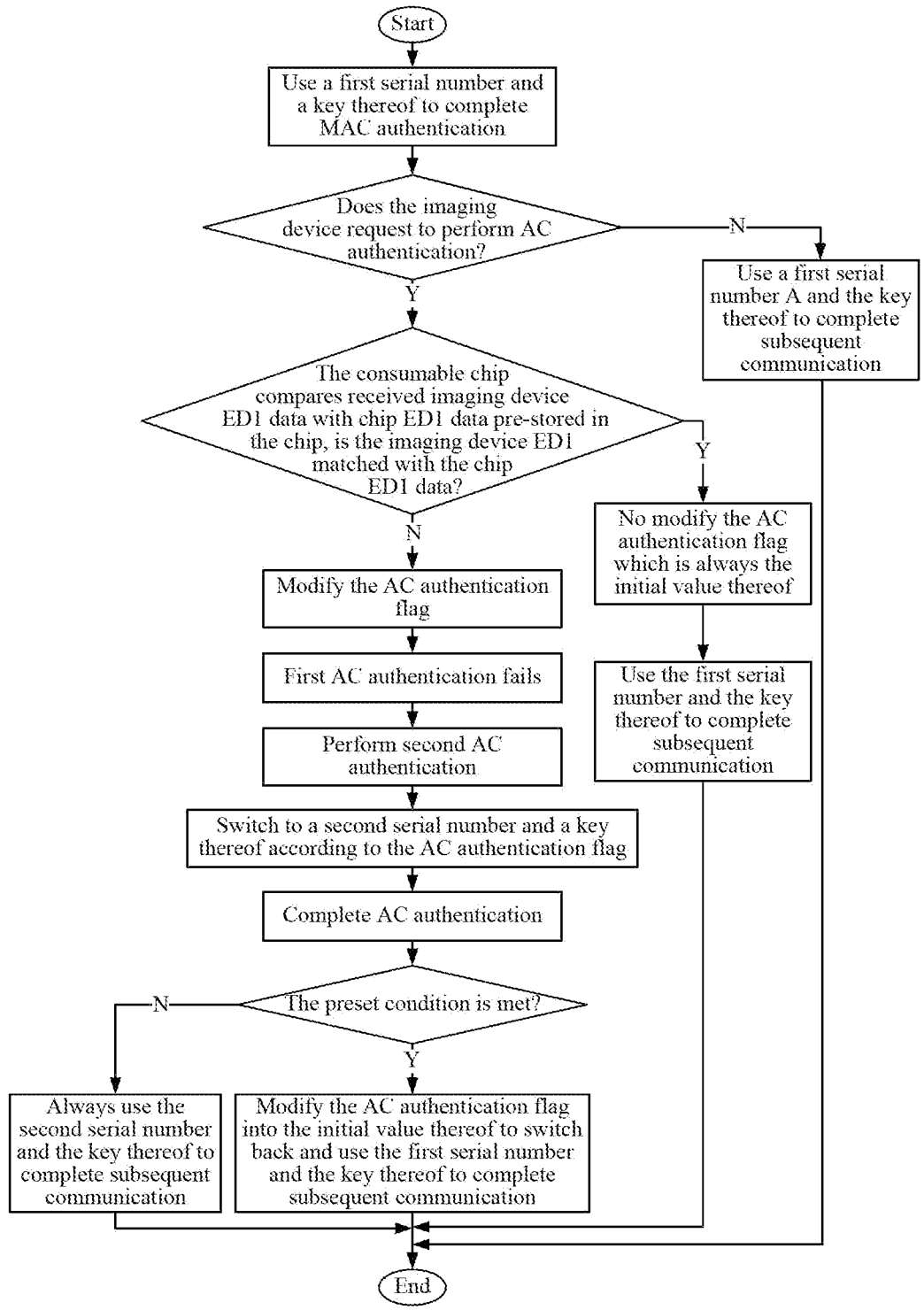

COMMUNICATION METHOD FOR CONSUMABLES CHIP, CONSUMABLES CHIP, AND CONSUMABLE

RELATED APPLICATIONS

This application is a national stage filing under 37 U.S.C. 371 of International Patent Application No. PCT/CN2020/096519, filed Jun. 17, 2020, which claims priority to Chinese Patent Application No. 201910635752.8, filed Jul. 15, 2019. The entire teachings of said applications are incorporated by reference herein.

TECHNICAL FIELD

The present disclosure relates to the technical field of printer consumables, and in particular, to a communication method for a consumables chip, a consumables chip, and a consumable.

BACKGROUND

A consumables chip of an imaging device may store multiple serial numbers, and these serial numbers are set by the image device manufacturer and used for identifying whether the consumables chip is legal or not.

The imaging device monitors the multiple serial numbers in the consumables chip. Once a serial number is recorded as used by the imaging device, this serial number cannot pass the verification of the imaging device thereafter. Therefore, the consumables chips on the market are required to obtain enough legal serial numbers to ensure the stable performance of the storage chip. For example, in the communication method for a consumable chip and an imaging device disclosed in the patent application publication No. CN109334259A, filed on Feb. 15, 2019, when the authentication detection of a consumable chip in the imaging device fails, the consumable chip re-receives the command data sent from the imaging device, and feeds back a response signal and another serial number to the imaging device until the authentication detection of the consumable chip passes.

However, in order to protect their own market interests, imaging device manufacturers constantly upgrade their imaging device. The upgraded imaging device has added specific verification steps in which an encryption algorithm is added or updated or the binding relationship between serial numbers and a segment of data is verified to increase the verification difficulty. After the imaging device is upgraded, the serial numbers originally stored in the consumable chip cannot pass the verification of the imaging device. However, it takes a much time and effort to crack the serial numbers of the upgraded imaging device, during the crack period, consumable manufacturers cannot obtain enough new serial numbers to perform mass production. Therefore, if the consumable chip in the technical solution of the preceding patent is used, mass production of the consumable chip cannot be achieved in a short time after the upgrading of the imaging device, which greatly affects the market share of consumable chips of corresponding models of the consumable manufacturer.

SUMMARY

In order to solve the preceding technical problems, the present disclosure provides a communication method for a consumables chip. The method includes the steps described below.

In a process of consumable serial number verification, non-Authentication Code (AC) authentication is performed with an imaging device based on a first serial number, and AC authentication is performed with the imaging device based on a second serial number.

The "AC authentication" in the present disclosure refers to a specific authentication step newly added after the imaging device is upgraded, and the "non-AC authentication" in the present disclosure refers to other authentication steps, including Message Authentication Code (MAC) authentication, before the imaging device is upgraded. In the preceding technical solution, the non-AC authentication is performed on the chip by using the first serial number which is set before the device is upgraded, such that the imaging device records the first serial number as a used chip serial number. The second serial number, which is set after the device is upgraded, is only used for AC authentication. After the imaging device is upgraded, even if only a group of second serial numbers are cracked, the group of second serial numbers can be used in combination with a large number of first serial numbers that have been cracked before the imaging device is upgraded, such that a large number of chips can pass the authentication of the upgraded imaging device, and mass production of consumables chips can be performed as soon as possible, thereby greatly increasing the market share of consumables chips of a manufacturer.

Further, in response to an AC authentication flag being an invalid value, a first serial number is sent to the imaging device to respond to a serial number request instruction of the imaging device, and communication is performed with the imaging device based on the first serial number; and in response to the AC authentication flag being a valid value, a second serial number is sent to the imaging device to respond to the serial number request instruction of the imaging device, and communication is performed with the imaging device based on the second serial number.

Further, the initial value of the AC authentication flag is an invalid value; in response to received imaging device ED1 data being not matched with chip ED1 data pre-stored in the chip, the AC authentication flag is modified into a valid value; and in response to receiving a combination of an imaging device commands having a specific sequence, the AC authentication flag is modified into an invalid value.

Further, the combination of the imaging device commands having the specific sequence includes four imaging device commands having the specific sequence sent after the cover of the imaging device is re-closed or after the imaging device is powered on again or off.

Further, in response to the AC authentication flag being a valid value, an AC authentication code is generated based on the chip ED1 data, chip ED2 data corresponding to the chip ED1 data, and chip read-only memory (ROM) data, and the AC authentication code is sent to the imaging device to respond to an AC authentication request instruction of the imaging device.

The present disclosure further provides a consumables chip. The consumables chip includes a communication unit which is configured to communicate with an imaging device, and further includes a logic control unit and a storage unit having a first serial number and a second serial number stored thereon. The logic control unit is configured to control the chip to perform non-AC authentication with the imaging device based on the first serial number in the process of consumable serial number verification, and is configured to perform AC authentication with the imaging device based on the second serial number in the process of consumable serial number verification.

In the preceding technical solution, the non-AC authentication is performed on the consumable chip by using the first serial number before the device is upgraded, such that the imaging device records the first serial number as a used chip serial number. The second serial number, which is used after the device is upgraded, is only used for AC authentication. After the imaging device is upgraded, even if only a group of second serial numbers are cracked, the group of second serial numbers can be used in combination with a large number of first serial numbers that have been cracked before the imaging device is upgraded, such that a large number of chips can pass the authentication of the upgraded imaging device, and mass production of consumables chips can be performed as soon as possible, thereby greatly increasing the market share of consumables chips of a manufacturer.

Preferably, the storage unit is further configured to store an AC authentication flag, and the logic control unit is configured to, in response to determining that the AC authentication flag is an invalid value, send a first serial number to the imaging device through the communication unit to respond to the serial number request instruction of the imaging device, and communicate with the imaging device through the communication unit based on the first serial number, and in response to determining that the AC authentication flag is a valid value, send a second serial number to the imaging device through the communication unit to respond to the serial number request instruction of the imaging device, and communicate with the imaging device through the communication unit based on the second serial number.

Preferably, the storage unit is further configured to store chip ED1 data, chip ED2 data, and chip ROM data, where the chip ED1 data and the chip ED2 data both correspond to the second serial number, and the logic control unit is configured to, in response to imaging device ED1 data received by the chip being not matched with the chip ED1 data, set the AC authentication flag to a valid value, and in response to the chip receiving an imaging device instruction of a specific sequence, set the AC authentication flag to an invalid value.

Preferably, the logic control unit is configured to, in response to determining that the AC authentication flag is a valid value, generate, based on the chip ED1 data, chip ED2 data corresponding to the chip ED1 data, and the chip ROM data, an AC authentication code, and send the AC authentication code to the imaging device through the communication unit to respond to an AC authentication request instruction of the imaging device.

Preferably, the storage unit is configured to store multiple groups of second serial numbers, chip ED1 data, and chip ED2 data, where the second serial numbers have one-to-one correspondence with the chip ED1 data and the chip ED2 data.

Preferably, the storage unit is configured to store multiple first serial numbers.

The present disclosure further provides a consumable. The consumable includes the consumable chip described above.

In the preceding technical solutions, the non-AC authentication is performed on the consumable chip of a consumable by using the first serial number before the device is upgraded, such that the imaging device records the first serial number as a used chip serial number. The second serial number, which is used after the device is upgraded, is only used for AC authentication. After the imaging device is upgraded, even if only a group of second serial numbers are cracked, the group of second serial numbers can be used in combination with a large number of first serial numbers that have been cracked before the imaging device is upgraded, such that a large number of chips can pass the authentication of the upgraded imaging device, and mass production of consumable chips can be performed as soon as possible, thereby greatly increasing the market share of consumables chips of a manufacturer.

BRIEF DESCRIPTION OF DRAWINGS

FIG. 1 is a method flowchart of a consumable communication method according to Embodiment one.

DETAILED DESCRIPTION

Embodiments of the present disclosure will be described below in detail in conjunction to the drawings. The embodiments are intended to illustrate the present disclosure and not to limit the present disclosure. Those of ordinary skill in the art can make modifications to the embodiments as needed on the premise that no creative work is done after reading through the specification. Any modification within the scope of the claims is protected.

Embodiment One

A communication method for a consumables chip is provided. The method is applicable to the consumable chip. The consumable chip includes a communication unit, a storage unit, and a logic control unit. The communication unit is configured to communicate with an imaging device on which the consumables chip is installed to achieve data interaction between the consumables chip and the imaging device. The storage unit is configured to store consumable information. The storage unit may be an Electrically Erasable Programmable read only memory (EEPROM) or a FLASH memory. For example, the storage unit in this embodiment is the FLASH memory. In order to enable the consumable chip to pass the authentication of the imaging device, at least a first serial number and related data thereof and a second serial number and related data thereof is stored in the storage unit. Specifically, in this embodiment, the first serial number is a legal serial number obtained by a consumable manufacturer before the imaging device is upgraded. Generally, multiple groups of first serial numbers and first keys corresponding to the first serial numbers are stored in the storage unit to ensure that at least one of these first serial numbers has not been recorded by the imaging device on which the consumable chip is installed. The second serial number is a legal serial number after the imaging device is upgraded. Generally speaking, the factory manufacturer upgrades the imaging device by upgrading an encryption algorithm or binding a new legal serial number with a segment of data, so as to increase the verification difficulty and protect its own market interests. At least one group of second serial numbers and related data thereof are stored in the storage unit in this embodiment. Specifically, the related data of the second serial numbers includes second keys corresponding to the second serial numbers, chip ED1 data having one-to-one correspondence with the second serial numbers, chip ED2 data having one-to-one correspondence with the second serial numbers, and chip ROM data, where the chip ED1 data is also related to imaging device ED1 data (the chip ED1 data in this embodiment is equivalent to imaging device ED1 data related to the chip ED1 data itself so that the consumables chip can find corresponding chip ED1 data according to the received imaging device ED1 data and then find corresponding chip ED2 data), and a requested AC authentication code is generated based on the chip ED1 data/imaging device ED1 data, the chip ED2 data, and the chip ROM data in the storage unit. The logic control unit is capable of controlling a serial number of the consumables chip for performing communication authentication with the imaging device to be switched between a first serial number and a second serial number so that the consumables chip can pass the authentication of the imaging device.

For the consumables chip in this embodiment, the communication authentication process between the upgraded imaging device on which the consumables chip is installed and the consumables chip includes the following specific authentication steps (that is, the AC authentication process):

1. The imaging device sends a serial number request instruction to the consumable chip to request the serial number of the consumable chip.

2. The consumable chip needs to provide its serial number to the imaging device to respond to the serial number request instruction of the imaging device.

3. After the imaging device receives the serial number sent by the consumables chip, the imaging device generates 4-byte special data (that is, imaging device ED1 data) through a certain algorithm and based on the serial number.

4. The imaging device sends the generated imaging device ED1 data to the consumable chip and sends an AC authentication request instruction to the consumables chip.

5. After the consumable chip receives the AC authentication request instruction sent by the imaging device, the consumable chip first searches for 12-byte data (that is, chip ED2 data) in the storage unit of the consumable chip based on the received imaging device ED1 data, and then generates an AC authentication code based on the imaging device ED1 data, the chip ED2 data, and the chip ROM data in the storage unit.

6. The consumable chip then sends the generated AC authentication code to the imaging device to response to the AC authentication request instruction of the imaging device.

7. After the imaging device receives the AC authentication code fed back by the consumable chip, the imaging device determines the received AC authentication code to determine whether the imaging box is legal or not.

Before the AC authentication, the imaging device also communicates with the consumable chip to perform other kinds of authentications (for example, MAC authentication) other than the AC authentication and operations. One consumable chip is only subjected to AC authentication once in one imaging device, the AC authentication is performed only when the consumable of the consumables chip is installed in the imaging device for the first time, and when the consumables chip passes the AC authentication, the AC authentication is no longer performed on the consumables chip.

The communication method for a consumables chip in this embodiment includes the steps described below.

In a process of consumable serial number verification, non-AC authentication is performed with an imaging device based on a first serial number, and AC authentication is performed with the imaging device based on a second serial number. In this embodiment, an AC authentication flag may be used to indicate which type of serial number the chip uses to perform communication verification with the imaging device: in response to the AC authentication flag being an invalid value, a first serial number is sent to the imaging device to response to a serial number request instruction of the imaging device and communication is performed with the imaging device based on the first serial number; and in response to the AC authentication flag being a valid value, a second serial number is sent to the imaging device to response to the serial number request instruction of the imaging device and communication is performed with the imaging device based on the second serial number.

Specifically, after the consumables chip is powered on and before the AC authentication is performed, the consumable chip performs other kinds of authentication including MAC authentication with the image device through the communication unit based on the first serial number. The initial value of the AC authentication flag is an invalid value. Then, when the AC authentication is performed between the imaging device and the consumable chip for the first time, since the AC authentication flag is an invalid value, the consumable chip still provides the first serial number to the imaging device in step 2, which causes that the imaging device ED1 data generated by the imaging device based on the first serial number in step 3 is not matched with the chip ED1 data pre-stored in the chip. In this way, the AC authentication flag is modified into a valid value. Meanwhile, the consumables chip cannot search for the chip ED1 data matched with the imaging device ED1 data in step 5, resulting in the failure of the first AC authentication. Since the imaging device has a "repetition mechanism", the imaging device re-starts the AC authentication after the first AC authentication fails and re-executes step 1. Since the AC authentication flag has been modified into a valid value at this time, the consumable chip provides a second serial number to the imaging device in step 2. The imaging device ED1 data generated by the imaging device based on the second serial number in Step 3 is matched with the chip ED1 data pre-stored in the chip. Therefore, in step 5, the consumable chip generates an AC authentication code based on the imaging device ED1 data/chip ED1 data, the chip ED2 data corresponding to the chip ED1 data, and the chip ROM data corresponding to the chip ED1 data, and sends the AC authentication code to the imaging device to respond to the AC authentication request instruction of the image device. In Step 7, since the AC authentication code sent by the chip is matched, the AC authentication will succeed. The communication is performed with the imaging device by using the second serial number and a corresponding second key in the subsequent communication verification process until a preset condition is detected, and then the second serial number is switched to the first serial number. The preset condition in this embodiment refers to that whether the cover of the imaging device is opened or closed or that whether the imaging device is powered off or on, that is, the preset condition is that the consumable chip is powered off and then re-powered on. In this case, the imaging device only sends four imaging device commands having the specific sequences once. When the consumable chip detects the combination of the imaging device commands having the specific sequence, the AC authentication flag is modified into an invalid value, thus switching back to the first serial number.

Embodiment Two

A consumable chip includes a communication unit, a storage unit, and a logic control unit. The communication unit is configured to communicate with an imaging device on which the consumable chip is installed to achieve data interaction between the consumable chip and the imaging device. The storage unit is configured to store consumable information. The storage unit may be an EEPROM or a FLASH memory. For example, the storage unit in this embodiment is the FLASH memory. In order to enable the consumable chip to pass the authentication of the imaging device, at least a first serial number and related data thereof and a second serial number and related data thereof is stored in the storage unit. Specifically, in this embodiment, the first serial number is a legal serial number obtained by a manufacturer before the imaging device is upgraded. Generally, multiple groups of first serial numbers and first keys corresponding to the first serial numbers are stored in the storage unit to ensure that at least one of these first serial numbers has not been recorded by the imaging device on which the consumable chip is installed. The second serial number is a legal serial number after the imaging device is upgraded. Generally speaking, the factory manufacturer upgrades the imaging device by upgrading an encryption algorithm or binding a new legal serial number with a segment of data, so as to increase the verification difficulty and protect its own market interests. At least one group of second serial numbers and related data thereof are stored in the storage unit in this embodiment. Specifically, the related data of the second serial numbers includes second keys corresponding to the second serial numbers, chip ED1 data having one-to-one correspondence with the second serial numbers, chip ED2 data having one-to-one correspondence with the second serial numbers, and chip ROM data, where the chip ED1 data is also related to imaging device ED1 data (the chip ED1 data in this embodiment is equivalent to imaging device ED1 data related to the chip ED1 data itself so that the consumable chip can find corresponding chip ED1 data according to the received imaging device ED1 data and then find corresponding chip ED2 data, and a requested AC authentication code is generated based on the chip ED1 data, the chip ED2 data, and the chip ROM data in the storage unit). The logic control unit, by performing the consumable communication method described in Embodiment one, controls a serial number of the consumable chip for performing communication authentication with the imaging device to be switched between a first serial number and a second serial number so that the consumable chip can pass the authentication of the imaging device.

The logic control unit is configured to control the consumable chip to perform non-AC authentication with an imaging device based on a first serial number, and control the consumable chip to perform AC authentication with the imaging device based on a second serial number. Specifically, the authentication process of the consumable chip and the imaging device may be flagged by using an AC authentication flag, and the logic control unit selects a serial number for performing communication authentication with the imaging device by determining whether the value of the AC authentication flag is valid. The AC authentication flag is also stored in the storage unit. When the AC authentication flag is an invalid value, the logic control unit controls the consumable chip to perform communication authentication with the imaging device by using the first serial number and related data thereof. When the AC authentication flag is a valid value, the logic control unit controls the chip to perform communication authentication with the imaging device by using the second serial number and related data thereof.

In this embodiment, the initial value of the AC authentication flag in the storage unit is set to an invalid value. The workflow of the consumable chip of this embodiment is as follows: after the consumable chip is powered on and starts to work, the consumable chip receives an instruction sent by the imaging device. The logic control unit, after receiving the instruction sent by the imaging device, first determines the state of the AC authentication flag to select a suitable serial number for performing communication verification with the imaging device. Since the initial value of AC authentication flag is an invalid value, after the consumable chip is powered on and before the AC authentication is performed, the logic control unit controls the consumable chip to perform other kinds of authentication including MAC authentication with the imaging device through the communication unit based on the first serial number. Then, when the imaging device and the consumable chip perform the AC authentication for the first time, the logic control unit determines that the AC authentication flag is an invalid value, and the logic control unit controls the consumable chip to still provide the first serial number to the imaging device in step 2, which causes that the imaging device ED1 data generated by the imaging device based on the first serial number in step 3 is not matched with the chip ED1 data pre-stored in the chip. In this way, the logic control unit modifies the AC authentication flag into a valid value. Meanwhile, the consumable chip cannot search for the chip ED1 data matched with the imaging device ED1 data in step 5, resulting in the failure of the first AC authentication. Since the imaging device has a "repetition mechanism", the imaging device re-starts the AC authentication after the first AC authentication fails and re-executes step 1. Since the AC authentication flag has been modified into a valid value at this time, in step 2, the logic control unit determines that the AC authentication flag is a valid value in step 2 and then controls the consumable chip to send a second serial number to the imaging device through the communication unit. In step 3, the imaging device ED1 data generated by the imaging device based on the second serial number is matched with the chip ED1 data pre-stored in the chip. Therefore, in step 5, the logic control unit generates an AC authentication code based on the imaging device ED1 data/chip ED1 data, the chip ED2 data corresponding to the chip ED1 data, and the chip ROM data, and sends the AC authentication code to the imaging device through the communication unit to respond to the AC authentication request instruction of the image device. In Step 7, since the AC authentication code sent by the chip is matched, the AC authentication will succeed. In the subsequent communication verification process, the logic control unit controls the consumable chip to communicate with the imaging device by using the second serial number and a corresponding second key until a preset condition is detected, and then the second serial number is switched to the first serial number. The preset condition in this embodiment refers to that whether the cover of the imaging device is opened or closed or that whether the imaging device is powered off or on, that is, the consumable chip is powered off and then re-powered on. In this case, the imaging device only sends four imaging device commands having the specific sequence once. When the logic control unit detects the imaging device command combination of the specific sequences, the logic control unit modifies the AC authentication flag into an invalid value, thus switching back to the first serial number.

Although the embodiments of the present disclosure have been described in conjunction with the drawings, various variations or modifications can be made by those skilled in the art within the scope of the appended claims.

What is claimed is:

1. A communication method for a consumable chip, comprising:

in a process of consumable serial number verification, performing non-AC authentication with an imaging device based on a first serial number, and in a case where the non-AC authentication with the imaging device based on the first serial number is successful, performing AC authentication with the imaging device based on a second serial number.

2. The communication method for a consumables chip according to claim 1, further comprising:

in response to an AC authentication flag being an invalid value, sending a first serial number to the imaging device to respond to a serial number request instruction of the imaging device, and communicating with the imaging device based on the first serial number; and in response to the AC authentication flag being a valid value, sending a second serial number to the imaging device to respond to the serial number request instruction of the imaging device, and communicating with the imaging device based on the second serial number.

3. The communication method for a consumables chip according to claim 2, wherein an initial value of the AC authentication flag is an invalid value;

in response to received imaging device ED1 data being not matched with chip ED1 data pre-stored in the chip, the AC authentication flag is modified into a valid value; and in response to receiving a combination of imaging device commands having a specific sequence, the AC authentication flag is modified into an invalid value.

4. The communication method for a consumables chip according to claim 3, wherein the combination of the imaging device commands having the specific sequence comprises four imaging device commands having the specific sequence sent after a cover of the imaging device is re-closed or after the imaging device is powered on again.

5. The communication method for a consumable chip according to claim 3, further comprising: in response to the AC authentication flag being a valid value, generating an AC authentication code based on the chip ED1 data, chip ED2 data corresponding to the chip ED1 data, and chip read-only memory (ROM) data, and sending the AC authentication code to the imaging device to respond to an AC authentication request instruction of the imaging device.

6. A consumable chip, comprising a communication unit which is configured to communicate with an imaging device and further comprising a logic control unit and a storage unit having a first serial number and a second serial number stored thereon; wherein the logic control unit is configured to control the chip to, in the process of consumable serial number authentication, perform non-AC authentication with the imaging device based on the first serial number, and in the case where the non-AC authentication with the imaging device based on the first serial number is successful, perform AC authentication with the imaging device based on the second serial number.

7. The consumable chip according to claim 6, wherein the storage unit is further configured to store an AC authentication flag; and the logic control unit is configured to, in response to determining that the AC authentication flag is an invalid value, send a first serial number to an imaging device through the communication unit to respond to a serial number request instruction of the imaging device, and communicate with the imaging device through the communication unit based on the first serial number; and in response to determining that the AC authentication flag is a valid value, send a second serial number to the imaging device through the communication unit to respond to the serial number request instruction of the imaging device, and communicate with the imaging device through the communication unit based on the second serial number.

8. The consumable chip according to claim 7, wherein the storage unit is further configured to store chip ED1 data, chip ED2 data, and chip read-only memory (ROM) data, wherein the chip ED1 data and the chip ED2 data both correspond to the second serial number; and the logic control unit is configured to, in response to imaging device ED1 data received by the chip being not matched with the chip ED1 data, set the AC authentication flag to a valid value; and in response to the chip receiving an imaging device instruction of a specific sequence, set the AC authentication flag to an invalid value.

9. The consumable chip according to claim 8, wherein the logic control unit is configured to, in response to determining that the AC authentication flag is a valid value, generate an AC authentication code based on the chip ED1 data, chip ED2 data corresponding to the chip ED1 data, and the chip ROM data, and send the AC authentication code to the imaging device through the communication unit to respond to an AC authentication request instruction of the imaging device.

10. The consumable chip according to claim 8, wherein the storage unit is configured to store a plurality of groups of second serial numbers, chip ED1 data, and chip ED2 data, wherein the second serial numbers have one-to-one correspondence with the chip ED1 data and the chip ED2 data.

11. The consumable chip according to claim 7, wherein the storage unit is configured to store a plurality of first serial numbers.

12. A consumable, comprising:

the consumable chip according to claim 6.

* * * * *